3,340,266
(3-AMINO-2-HYDROXYPROPOXY)-BENZO-
HETEROCYCLIC DERIVATIVES
Ralph Howe and Bernard Joseph McLoughlin, Macclesfield, England, assignors to Imperial Chemical Industries Limited, London, England, a corporation of Great Britain
No Drawing. Filed July 20, 1964, Ser. No. 383,940
Claims priority, application Great Britain, July 30, 1963, 30,135/63; Jan. 16, 1964, 1,990/64
14 Claims. (Cl. 260—288)

This invention relates to new heterocyclic derivatives which possess $\beta$-adrenergic blocking activity and which are therefore useful in the treatment or prophylaxis of heart diseases such as cardiac arrhythmias and agina pectoris.

According to the invention we provide heterocyclic derivatives of the formula:

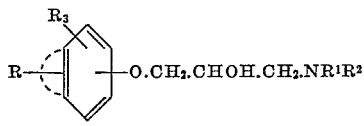

wherein R has the meaning stated hereinafter, $R^1$ stands for hydrogen or an alkyl radical, and $R^2$ stands for an alkyl, cycloalkyl, alkenyl or aralkyl radical, any of which may optionally be substituted, wherein the ring B may optionally bear one or more additional substituents, and wherein the ring A is a 5-, 6-, 7-, or 8-membered heterocyclic ring containing one or more hetero-atoms, the said heterocyclic ring optionally bearing one or more substituents, and the esters, derived oxazolidines, and the salts thereof.

It is to be understood that the above definition encompasses all possible stereoisomeric forms of the heterocyclic derivatives in question. These may be optically active forms or they may be racemates of the diastereoisomers that are capable of existence when more than one centre of asymmetry is present in the molecule. It is also to be understood that in this specification expressions such as "lower alkyl radical" or "lower alkenyl radical" mean such radicals of not more than 6 carbon atoms. It is also to be understood that expressions in which there is no mention of substituents, for example the expression "lower alkyl radical," only encompasses the unsubstituted radicals in question.

As a suitable value for $R^1$ when it stands for an alkyl radical there may be mentioned, for example, a lower alkyl radical, for example, the methyl or isopropyl radical.

As a suitable value for $R^2$ when it stands for an alkyl radical there may be mentioned, for example, an alkyl radical of not more than 10 carbon atoms, for example the n-propyl, isopropyl, isobutyl, s-butyl, t-butyl, 1-methylbutyl or 1-methyloctyl radical. As a suitable value for $R^2$ when it stands for a substituted alkyl radical there may be mentioned, for example, an alkyl radical of not more than 10 carbon atoms bearing one or more hydroxy or lower alkoxy radicals, for example the methoxy radical. As a suitable value for $R^2$ when it stands for an aralkyl radical optionally substituted, there may be mentioned, for example, an aralkyl radical of not more than 10 carbon atoms, optionally substituted with, for example, one or more lower alkyl or alkoxy radicals. Thus, specific values for $R^2$ when it stands for a substituted alkyl radical or for an aralkyl radical are the 2-hydroxy-1,1-dimethylethyl or 1-methyl-3-phenylpropyl radical.

As a suitable value for $R^2$ when it stands for a cycloalkyl radical there may be mentioned, for example, a cycloalkyl radical of not more than 10 carbon atoms, for example the cyclopentyl radical.

As a suitable value for $R^2$ when it stands for an alkenyl radical there may be mentioned, for example, a lower alkenyl radical, for example the allyl radical.

As suitable optional additional substituents in the ring B there may be mentioned, for example, one or more $R^3$ groups selected from halogen atoms, for example one or more chlorine or bromine atoms.

As suitable hetero-atoms in the heterocyclic ring A there may be mentioned, for example, one or more oxygen and/or nitrogen atoms.

Suitable substituents R which may optionally be present in the heterocyclic ring A are lower alkyl radicals, for example the methyl or ethyl radical, or the oxo or hydroxy radical, or the radical of the formula

—CH=CH—CH=CH— which together with an ethylene residue (>C=C<) in the heterocyclic ring A forms a benzene residue.

Suitable values for the heterocyclic structure formed by the ring A, optionally substituted, and ring B are, for example, 1,4-benzodioxan, 1,3-benzodioxole, 3,4-dihydro-2H-1,5-benzodioxepin, 2,3,4,5-tetrahydro-1,6-benzodioxocin, xanthone, xanthene, 9-hydroxyxanthene, 1,2-dihydro-1,4 - dimethyl-2-oxoquinoline, 2,3-dihydrobenzofuran and chroman-4-one.

Particularly valuable heterocyclic derivatives of the invention are, for example, 5-(2-hydroxy-3-isopropylaminopropoxy)-1,4-benzodioxan,
4-(2-hydroxy-3-isopropylaminopropoxy)xanthone,
4-(2-hydroxy-3-t-butylaminopropoxy)xanthone,
4-(2-hydroxy-3-isopropylaminopropoxy)xanthene,
6-(3-t-butylamino-2-hydroxypropoxy)-3,4-dihydro-2H-1,5-benzodioxepin,
6-(2-hydroxy-3-isopropylaminopropoxy)-3,4-dihydro-2H-1,5-benzodioxepin,
8-(2-hydroxy-3-isopropylaminopropoxy)chroman-4-one,
9-hydroxy-4-(2-hydroxy-3-isopropylaminopropoxy)xanthene,
4-[2-hydroxy-3-(2-hydroxy-1,1-dimethylethylamino) propoxy]xanthene, and
4-[2-hydroxy-3-(2-hydroxy-1,1-dimethylethylamino) propoxy]xanthone, and the salts thereof.

As suitable esters of the heterocyclic derivatives of the invention there may be mentioned, for example, O-esters derived from acids of the formula X.COOH wherein X stands for an alkyl, alkenyl or aryl radical, optionally substituted, for example an alkyl or alkenyl radical of not more than 20 carbon atoms or an aryl radical of not more than 10 carbon atoms, for example the methyl or phenyl radical, and the salts thereof.

As suitable oxazolidine derivatives of the invention there may be mentioned, for example, oxazolidines of the formula:

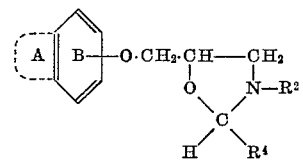

wherein A, B and $R^2$ have the meanings stated above and $R^4$ stands for hydrogen or an alkyl or aryl radical, for example a lower alkyl radical or the phenyl radical, and the salts thereof.

As suitable salts of the heterocyclic derivatives of the invention there may be mentioned acid-addition salts, for example salts derived from inorganic acids, for example hydrochlorides, hydrobromides, phosphates or sulphates, or salts derived from organic acids, for example oxalates, lactates, tartrates, acetates, salicylates or citrates.

According to a further feature of the invention we provide a process for the manufacture of the heterocyclic derivatives of the invention which comprises the interaction of a compound of the formula:

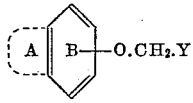

wherein A and B have the meanings stated above, and Y stands for the group:

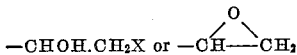

wherein X stands for a halogen atom and an amine of the formula $NHR^1R^2$, wherein $R^1$ and $R^2$ have the meanings stated above.

As a suitable value for X there may be mentioned, for example, a chlorine or bromine atom. The interaction may be carried out in a solvent or diluent, for example, ethanol, and it may conveniently be accelerated or completed by the application of heat.

According to a further feature of the invention we provide a process for the manufacture of the heterocyclic derivatives of the invention which comprises the interaction of a hydroxy-heterocyclic derivative of the formula:

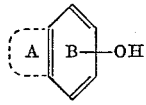

wherein A and B have the meanings stated above, with an epoxide of the formula:

wherein $R^1$ and $R^2$ have the meanings stated above.

The epoxide may be generated in situ, for example, it may be generated by conventional means from the corresponding halohydrin.

According to a further feature of the invention we provide a process for the manufacture of those of the heterocyclic derivatives of the invention wherein $R^2$ stands for an alkyl, cycloalkyl or aralkyl radical, any of which may optionally be substituted, apart from a benzyl or substituted benzyl radical, which comprises the hydrogenolysis of a compound of the formula:

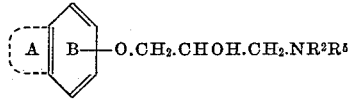

wherein A, B and $R^2$ have the meanings stated above, and $R^5$ stands for a hydrogenolysable radical, or a salt thereof.

As a suitable value for $R^5$ there may be mentioned, for example, the benzyl or benzyloxycarbonyl radical. The hydrogenolysis may be effected, for example, by the use of hydrogen and a hydrogenation catalyst, for example a palladium-on-charcoal catalyst, in an inert diluent or solvent, for example ethanol.

According to a further feature of the invention we provide a process for the manufacture of those of the heterocyclic derivatives of the invention that are of the formula:

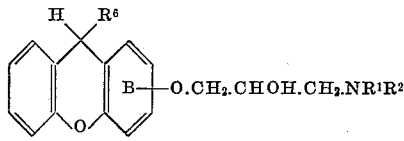

wherein $R^1$, $R^2$ and B have the meanings stated above, and $R^6$ stands for hydrogen or the hydroxy radical, which comprises the reduction of a compound of the formula:

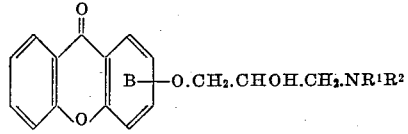

wherein $R^1$, $R^2$ and B have the meanings stated above.

Suitable reducing conditions are those provided by an alkali metal, for example sodium, together with a lower alkanol, for example ethanol, or by zinc and an alkali metal hydroxide, for example sodium hydroxide, in an inert solvent or diluent, for example ethanol.

It is to be understood that reduction by means of an alkali metal and a lower alkanol provides the heterocyclic derivative wherein $R^6$ stands for hydrogen, and that reduction by means of zinc and an alkali metal hydroxide provides the heterocyclic derivative wherein $R^6$ stands for the hydroxy radical.

According to a further feature of the invention we provide a process for the manufacture of the esters of the invention which comprises the interaction of a heterocyclic derivative of the formula:

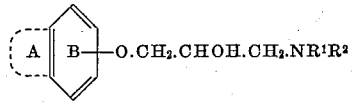

wherein A, B, $R^1$ and $R^2$ have the meanings stated above, with a compound of the formula $R^3.COX$ or $(R^3.CO)_2O$ wherein $R^3$ and X have the meanings stated above.

According to a further feature of the invention we provide a process for the manufacture of the oxazolindine derivatives of the invention which comprises the interaction of a heterocyclic derivative of the formula:

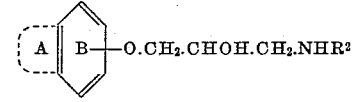

wherein A, B and $R^2$ have the meanings stated above, with an aldehyde of the formula $R^4.CHO$ wherein $R^4$ has the meaning stated above.

The interaction may be carried out in a solvent or diluent, for example ethanol, and it may be accelerated or completed by the application of heat.

According to a further feature of the invention we provide a process for the manufacture of those of the heterocyclic derivatives of the invention in which ring B bears one or more halogen substituents, which comprises the halogenation of a heterocyclic derivative of the formula:

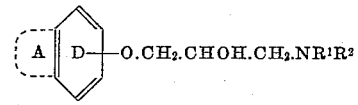

wherein A, $R^1$ and $R^2$ have the meanings stated above, and the ring D bears no substituents in a position ortho and/or para to the hydroxy-amino-propoxy radical.

The halogenation may be carried out in a diluent or solvent, for example acetic acid.

As stated above, the heterocyclic derivatives of the present invention are useful in the treatment or prophylaxis of heart diseases.

According to a further feature of the invention, therefore, we provide pharmaceutical compositions comprising as active ingredient(s) at least one of the heterocyclic derivatives of the invention, or an ester, oxazolidine derivative, or salt thereof, in admixture with a pharmaceutically-acceptable diluent or carrier.

The said pharmaceutical compositions may be in the form of tablets, capsules, aqueous or oily solutions, aqueous or oily suspensions, emulsions, sterile, injectable aqueous or oily solutions or suspensions, or disperible powders.

Suitable tablets may be formulated by admixture of the active ingredient(s) with known pharmaceutical excipients, for example inert diluents, for example calcium carbonate, calcium phosphate or lactose, disintegrating agents, for example maize starch or alginic acid, binding agents, for example starch, gelatin or acacia mucilage, and lubricating agents, for example magnesium stearate, stearic acid or talc. Such tablets may optionally be coated by known techniques in order to delay disintegration in the stomach and thus to provide a sustained action over an extended period.

The aqueous suspensions, emulsions, oily solutions and suspensions of the invention generally contain a sweetening agent, for example glycerol, dextrose or sucrose, and a flavouring agent, for example vanillin or orange extract, in order to provide a palatable product. The aqueous suspensions of the invention may also contain suitable suspending or thickening agents, for example sodium carboxymethylcellulose, wetting agents, for example condensation products of fatty alcohols with ethylene oxide, and preservatives, for example methyl or propyl p-hydroxybenzoate.

The emulsions of the invention may contain the active ingredient(s) dissolved in an oil of vegetable or animal origin, for example arachis oil or cod liver oil, and may also contain sweetening agents and flavouring agents which may with advantage be essential oils. The said emulsions may also contain emulsifying agents and dispersing agents, for example soya bean lecithin, polyoxyethylene sorbitan mono-oleate, gum acacia, gum tragacanth or casein, and preservatives, for example methyl or propyl p-hydroxybenzoate, and anti-oxidants, for example propyl gallate.

The oily solutions of the invention likewise contain the active ingredient(s) in solution in an oil of vegetable or animal origin, and may optionally contain flavouring agents to mask the taste and improve oral acceptability. Such oily solutions may advantageously be filled into soft gelatin capsules. The oily solutions may also contain sweetening agents, for example icing sugar, in which case the oil phase may be in addition contain a suspending agent, for example beeswax, to maintain the redispersion properties of the suspension.

Oral compositions in the form of gelatin capsules may contain the active ingredient(s) alone or in admixture with inert diluents, for example lactose or sorbitol.

The sterile injectable aqueous suspensions of the invention may contain a suspending or thickening agent, for example sodium carboxymethylcellulose, and a wetting or dispersing agent, for example a phenolpolyethylene oxide condensate, for example the condensation product of octylcresol with about 8–10 molecular proportions of ethylene oxide. The sterile injectable oily solutions of the invention may be prepared from a non-toxic injectable oil, for example arachis oil or ethyl oleate, and they may additionally contain a gelling agent, for example aluminum stearate, to delay absorption within the body. These sterile aqueous or oily injectable preparations may contain preservatives such as methyl or n-propyl p-hydroxybenzoate, or chlorbutanol.

The invention is illustrated but not limited by the following examples in which the parts are by weight:

*Example 1*

A mixture of 4.8 parts of 5-(3-chloro-2-hydroxypropoxy) - 1,4 - benzodioxan and 18 parts of isopropylamine is heated in a sealed vessel at 100° C. for 10 hours. The vessel is cooled and then the excess of isopropylamine is evaporated. The residual gum is shaken with 50 parts of N-hydrochloric acid and 50 parts of ether. 10 parts of 8 N-sodium hydroxide are added to the aqueous acid solution and the mixture is extracted with ether. The ether extract is washed with water, dride with anhydrous magnesium sulphate and then evaporated to dryness. The solid residue is crystallised from ethyl acetate and there is thus obtained 5 - (2-hydroxy-3-isopropylaminopropoxy)-1,4-benzodioxan, M.P. 104–105° C.

The 5-(3-chloro-2-hydroxypropoxy) - 1,4 - benzodioxan used as starting material may be obtained as follows:

A mixture of 7.6 parts of 5-hydroxy-1,4-benzodioxan, 25 parts of epichlorohydrin and 0.1 part of piperidine is heated at 100° C. for 12 hours, and the excess of epichlorohydrin is then removed under reduced pressure. The residual oil is shaken with 75 parts of chloroform and 25 parts of concentrated hydrochloric acid. The chloroform solution is washed with water, dried with anhydrous magnesium sulphate and then evaporated to dryness. There is thus obtained 5 - (3-chloro-2-hydroxypropoxy) - 1,4-benzodioxan as an oil.

*Example 2*

The process described in Example 1 is repeated using 4.8 parts of 5 - (3-chloro-2-hydroxypropoxy) - 1,3-benzodioxole in place of 4.8 parts of 5 - (3-chloro-2-hydroxypropoxy)-1,4-benzodioxan. There is thus obtained 5-(2-hydroxy-3-isopropylaminopropoxy) - 1,3 - benzodioxole, M.P. 76–77° C. (crystallised from petroleum ether, B.P. 60–80° C.)

The 5 - (3-chloro-2-hydroxypropoxy)-1,3-benzodioxole used as starting material is obtained by repeating the second process described in Example 1, but using 5-hydroxy-1,3-benzodioxole in place of 5-hydroxy1,4-benzodioxan. There is thus obtained 5-(3-chloro-2-hydroxypropoxy)-1,3-benzodioxole as an oil.

*Example 3*

2 parts of 6 - (3 - chloro - 2 - hydroxypropoxy) - 1,2-dihydro - 1,4 - dimethyl - 2 - oxoquinoline and 14 parts of isopropylamine are heated together in a sealed tube at 100° C. during 10 hours. The mixture is evaporated to dryness under reduced pressure and the residue is stirred together with 2 parts of a saturated ethereal hydrogen chloride solution during 5 minutes. The mixture is filtered and the solid residue is heated during 5 minutes together with a mixture of 10 parts of ethanol and 10 parts of acetone. The mixture is filtered and the solid residue is crystallized from a mixture of acetone and methanol. The product so obtained is suspended in 10 parts of water, and 10 parts of 2 N-sodium hydroxide solution are added. The mixture is extracted three times with 20 parts of chloroform and the combined chloroform extracts are washed twice with 20 parts of water and then dried with anhydrous magnesium sulphate. The solvent is removed by distillation and the residue is crystallized from a mixture of petroleum ether (B.P. 60–80° C.) and ethyl acetate. There is thus obtained 1,2 - dihydro - 6 - (2 - hydroxy-3 - isopropylaminopropoxy) - 1,4 - dimethyl - 2 - oxoquinoline, M.P. 104–105° C.

The 6 - (3 - chloro - 2 - hydroxypropoxy) - 1,2 - dihydro - 1,4 - dimethyl - 2 - oxoquinoline used as starting material may be obtained as follows:

3.8 parts of 1,2 - dihydro - 6 - hydroxy - 1,4 - dimethyl-2 - oxoquinoline, 25 parts of epichlorohydrin and 0.05 part of piperidine are heated together at 90–100° C. during 24 hours. The mixture is evaporated to dryness under reduced pressure and 30 parts of chloroform are added to the residue. The mixture is filtered and the filtrate is washed three times with 20 parts of 2 N-sodium hydroxide solution, and twice with 20 parts of water. The chloroform solution is then dried with anhydrous magnesium sulphate and evaporated to dryness. The residue is crystallised from a mixture of petroleum ether (B.P. 60–80° C.) and ethyl acetate. There is thus obtained 6 - (3 - chloro - 2 - hydroxypropoxy) - 1,2 - dihydro - 1,4 - dimethyl - 2 - oxoquinoline, M.P. 129–130° C. but sets immediately and remelts at 140–141° C.

1,2 - dihydro - 6 - hydroxy - 1,4 - dimethyl - 2 - oxoquinoline may be obtained in the following manner:

1 part of 1,2 - dihydro - 6 - methoxy - 1,4 - dimethyl-2 - oxoquinoline is suspended in 22 parts of a 48% aqueous solution of hydrogen bromide, and the mixture is heated under reflux during 30–45 minutes. The mixture is cooled and 20 parts of water are added. The mixture is filtered and the solid residue is crystallised from a mixture of methanol and dimethylformamide. There is thus obtained 1,2 - dihydro - 6 - hydroxy - 1,4 - dimethyl - 2-oxoquinoline, M.P. 285–286° C. with decomposition.

1,2 - dihydro - 6 - methoxy - 1,4 - dimethyl - 2 - oxoquinoline may be obtained in the following manner:

24 parts of 2 - hydroxy - 6 - methoxy - 4 - methylquinoline are suspended in 600 parts of 2.5 N-sodium hydroxide solution. The mixture is stirred rapidly and heated at 90–100° C. while 328 parts of dimethyl sulphate are added in portions of 43 parts during 30 minutes. The alkaline mixture is stirred and heated during a further hour, and then cooled and extracted 4 times with 60 parts of chloroform. The combined chloroform extracts are washed twice with 100 parts of water and dried with anhydrous magnesium sulphate. The solvent is removed by distillation and the residue is crystallised from ethyl acetate. There is thus obtained 1,2 - dihydro - 6 - methoxy-1,4 - dimethyl - 2 - oxoquinoline, M.P. 129–130 °C.

*Example 4*

The process described in Example 1 is repeated using 5.25 parts of 2 - amino - 2 - methyl - 1 - propanol in place of 18 parts of isopropylamine. There is thus obtained 5 - [2 - hydroxy - 3 - (2 - hydroxy - 1,1 - dimethylethylamino)propoxy] - 1,4 - benzodioxan, M.P. 91–92° C. [crystallised from a mixture of ethyl acetate and light petroleum (B.P. 40–60° C.)]

*Example 5*

A mixture of 2 parts of 4 - (3 - chloro - 2 - hydroxypropoxy) - xanthone and 21 parts of isopropylamine is heated in a sealed tube at 100° C. for 10 hours. The excess isopropylamine is removed from the reaction mixture by evaporation under reduced pressure and the residue thus obtained is dissolved in 50 parts of 2 N aqueous hydrochloric acid. The acidic solution is washed with 60 parts of ether in three equal portions and the ethereal washings are discarded. The acidic solution is then made alkaline by addition of 5 N-aqueous sodium hydroxide and the alkaline solution is extracted with 250 parts of a 1:1 mixture of ether and ethyl acetate in five equal portions. The extracts are combined and the solution thus obtained is washed with 50 parts of water and is then dried over anhydrous sodium sulphate and evaporated to dryness. The solid residue is crystallised from ethyl acetate. There is thus obtained 4 - (2 - hydroxy - 3 - isopropylaminopropoxy) - xanthone, M.P. 145–146° C.

The 4 - (3 - chloro - 2 - hydroxypropoxy)xanthone used as starting material may be obtained as follows:

A mixture of 2 parts of 4 - hydroxyxanthone, 12 parts of epichlorohydrin and 0.02 part of piperidine is heated at 90–100° C. for 24 hours. The excess of epichlorohydrin is removed by evaporation under reduced pressure and the residue thus obtained is dissolved in 100 parts of chloroform. The chloroform solution is then washed with the following reagents in the order given:

(a) 150 parts of 2 N-aqueous sodium hydroxide in three equal portions, (b) 100 parts of water in two equal portions, (c) 20 parts of concentrated hydrochloric acid, and (d) 100 parts of water in two equal portions. The chloroform solution is then dried over anhydrous sodium sulphate. The dried solution is evaporated to dryness and the residue is crystallised from ethyl acetate. There is thus obtained 4 - (3 - chloro - 2 - hydroxypropoxy)xanthone, M.P. 158–159° C.

*Example 6*

1 part of 4 - (2 - hydroxy - 3 - isopropylaminopropoxy)-xanthone is dissolved in 20 parts of ethanol and the solution is stirred while 2.5 parts of sodium are slowly added in small pieces during 30 minutes. The resulting mixture is heated under reflux during 1 hour and is then cooled and poured into 200 parts of ice-cold water. The mixture thus obtained is extracted with 150 parts of ether in three equal portions. The combined ethereal extracts are washed with 100 parts of water in two equal portions and are then dried over anhydrous sodium sulphate and evaporated to dryness. The solid residue thus obtained is crystallised from cyclohexane. There is thus obtained 4 - (2 - hydroxy - 3 - isopropylaminopropoxy)xanthene, M.P. 128–129° C.

*Example 7*

A mixture of 3 parts of 6-(3 - chloro - 2 - hydroxypropoxy)-3,4-dihydro-2H-1,5-benzodioxepin and 12 parts of t-butylamine is heated in a sealed vessel at 100° C. for 10 hours. The vessel is cooled and the excess of t-butylamine is evaporated. The residual gum is shaken with a mixture of 40 parts of N-hydrochloric acid and 40 parts of ether and the ethereal layer is discarded. The aqueous acid solution is then made alkaline by the addition of 8 parts of 8 N-aqueous sodium hydroxide and the alkaline solution is extracted with ether. The ether extract is washed with water and dried with anhydrous magnesium sulphate and is then evaporated to dryness. The solid residue thus obtained is crystallised from light petroleum (B.P. 40–60° C.) and there is thus obtained 6-(3-t-butylamino-2-hydroxypropoxy)-3,4-dihydro-2H-1,5 - benzodioxepin, M.P. 86–87° C.

The 6-(3-chloro-2-hydroxypropoxy)-3,4-dihydro-2H-1,5-benzodioxepin used as starting material may be obtained as follows:

A mixture of 6 parts of 6-hydroxy-3,4-dihydro-2H-1,5-benzodioxepin in 20 parts of epichlorhydrin and 0.1 part of piperidine is heated at 100° C. for 24 hours, and the excess of epichlorhydrin is then removed under reduced pressure. The residual oil is shaken with a mixture of 75 parts of chloroform and 25 parts of concentrated hydrochloric acid and the aqueous phase is discarded. The chloroform solution thus obtained is washed with water and dried with anhydrous magnesium sulphate and is then evaporated to dryness. There is thus obtained 6-(3-chloro-2-hydroxypropoxy)-3,4-dihydro-2H-1,5-benzodioxepin as an oil.

The 6-hydroxy-3,4-dihydro-2H-1,5-benzodioxepin may be obtained as follows:

200 parts of 1,3-dibromopropane are added to a stirred solution of 62 parts of pyrogallol and 55 parts of potassium hydroxide in 300 parts of absolute ethanol at ambient temperature. When the initial exothermic reaction has subsided, the resulting mixture is heated under reflux with stirring in an atmosphere of nitrogen for 16 hours. The mixture is then cooled and filtered and the filtrate is evaporated to dryness. The residual oil is shaken with a mixture of 200 parts of ether and 100 parts of water and the aqueous phase is discarded. The ethereal solution thus obtained is dried with anhydrous magnesium sulphate and is then evaporated. The residual oil is distilled under reduced pressure and the fraction of B.P. 128–140° C. at 1 mm. pressure is collected. This fraction is stirred together with 300 parts of benzene and the solid thus precipitated is removed by filtration and is discarded. The filtrate is evaporated and the solid residue thus obtained is crystallised from light petroleum (B.P. 60–80° C.). There is thus obtained 6-hydroxy-3,4-dihydro-2H-1,5-benzodioxepin, M.P. 109–110° C.

*Example 8*

The process described in Example 7 is repeated except that 12 parts of isopropylamine are used in place of 12 parts of t-butylamine. There is thus obtained 6-(2-hydroxy-3-isopropylaminopropoxy)-3,4 - dihydro - 2H - 1,5-benzodioxepin, M.P. 67–68° C.

Example 9

A mixture of 3 parts of 4 - (3 - chloro - 2 - hydroxypropoxy)-xanthone and 20 parts of t-butylamine is heated in a sealed tube at 100° C. for 10 hours. The reaction mixture is treated by the process described in Example 5, and there is thus obtained 4-(2-hydroxy-3-t-butylaminopropoxy)xanthone, which after crystallisation from a mixture of petroleum ether (B.P. 60–80° C.) and ethyl acetate has M.P. 120–121° C.

Example 10

A mixture of 3 parts of 4-(3-chloro-2-hydroxypropoxy)xanthone, 1.78 parts of 2-amino-2-methyl - 1 - propanol, and 20 parts of ethanol is heated at 100° C. for 10 hours. The ethanol is removed by evaporation under reduced pressure and the residue thus obtained is stirred with 50 parts of 2 N-hydrochloric acid solution for 5 minutes during which time a viscous oil separates from the solution. The oil is separated from the mother liquors by decantation and washed twice with ether. The mother liquors are washed twice with ether and are then combined with the oil. The mixture is then made alkaline with 2 N-aqueous sodium hydroxide. The alkaline mixture is extracted four times with a mixture of 90 parts of ether and 10 parts of ethanol. The combined extracts are washed twice with 50 parts of saturated salt solution, dried over anhydrous magnesium sulphate and evaporated under reduced pressure. There is thus obtained as a residue 4-[2-hydroxy-3-(2 - hydroxy - 1,1 - dimethylethylamino)-propoxy]xnathone, which, after crystallisation from benzene, has M.P. 128–129° C.

Example 11

Example 6 is repeated except that 1 part of 4-[2-hydroxy-3-(2-hydroxy - 1,1 - dimethylethylamino)propoxy]-xanthone is used in place of 1 part of 4-(2-hydroxy-3-isopropylaminopropoxy)xanthone and 40 parts of ethanol are used in place of 20 parts of ethanol. There is thus obtained 4-[2-hydroxy-3-(2-hydroxy - 1,1 - dimethylethylamino)propoxy]xanthene, which is crystallised from a mixture of benzene and light petroleum (B.P. 60–80° C.) and has M.P. 126° C.

Example 12

A mixture of 4.5. parts of 4-(3-chloro-2-hydroxypropoxy)xanthone, 4.47 parts of 1-methyl-3-phenylpropyl-amine and 20 parts of ethanol is heated in a sealed tube at 100° C. for 10 hours. The reaction mixture is evaporated to dryness under reduced pressure and the residue is stirred during 10 minutes with 50 parts of ether. The mixture is filtered and the filtrate is retained. The solid residue on the filter is boiled with 35 parts of ethyl acetate, the mixture is filtered, and the filtrate is combined with the ethereal filtrate mentioned above. The combined filtrates are evaporated to dryness under reduced pressure. The residue thus obtained is boiled with 50 parts of cyclohexane and the cyclohexane solution is decanted from the undissolved solid and retained. The undissolved solid material is then crystallised four times from a mixture of ethyl acetate and petroleum ether (B.P. 60–80° C.) and there is thus obtained a diastereoisomeric form of 4-[2-hydroxy-3-(1-methyl - 3 - phenylpropylamino)propoxy]xanthone M.P. 127–129° C.

The cyclohexane solution which was retained is evaporated to dryness under reduced pressure and the residue is dissolved in 50 parts of ether. The ethereal solution is cooled and stirred while a saturated ethereal solution of hydrogen chloride is added dropwise, until a slight excess of hydrogen chloride is present. The mixture is filtered, and the solid residue is crystallised three times from a mixture of ethyl acetate and ethanol. There is thus obtained 4-[2-hydroxy-3-(1-methyl-3-phenylpropylamino)-propoxy]xanthone hydrochloride, M.P. 193–196° C. The corresponding free base is obtained from the hydrochloride by basification with 20 parts of 2 N-aqueous sodium hydroxide and extraction into 100 parts of ether. The residue obtained by evaporation of the dried ethereal solution is crystallised from cyclohexane and there is thus obtained a diastereoisomeric form of 4-[2-hydroxy-3-(1-methyl-3-phenylpropylamino)propoxy]xanthone, M.P. 106–108° C.

Example 13

A mixture of 1 part of 4-[2-hydroxy-3-isopropylaminopropoxy]xanthone, 4 parts of sodium hydroxide and 40 parts of ethanol is heated under reflux, and 4 parts of zinc dust are added in small portions during one hour. The mixture is heated under reflux for a further 18 hours and is then cooled and filtered. The filtrate is poured into 400 parts of water and the aqueous mixture is extracted four times with 100 parts of ether. The combined ethereal extracts are washed with 100 parts of water and then twice with 50 parts of a saturated aqueous solution of sodium chloride. The ethereal extract is dried over anhydrous magnesium sulphate and evaporated to dryness. The residue is crystallised from ethyl acetate and there is thus obtained 9-hydroxy-4-[2-hydroxy - 3 - isopropylaminopropoxy]xanthone, M.P. 136–138° C.

Example 14

A solution of 3 parts of 5-(3-chloro-2-hydroxypropoxy)-1,4-benzodioxan and 2.1 parts of cyclopentylamine in 12 parts of ethanol is heated in a sealed vessel at 100° C. for 10 hours. The vessel is cooled and then the excess of cyclopentylamine and the ethanol are evaporated. The residual gum is shaken together with 40 parts of N-hydrochloric acid and 40 parts of ether. The aqueous phase is separated, 8 parts of 8 N-sodium hydroxide are added to it, and the resulting mixture is extracted with ether. The ethereal extract is washed with water, dried with anhydrous magnesium sulphate and then evaporated to dryness. The solid residue is crystallised from light-petroleum (B.P. 60–80° C.), and there is thus obtained 5-(3-cyclopentylamino - 2 - hydroxypropoxy)-1,4-benzodioxan, M.P. 87–88° C.

Example 15

The process of Example 14 is repeated using 1.4 parts of allylamine in place of 2.1 parts of cyclopentylamine. 5-(2-hydroxy - 3 - allylaminopropoxy)-1,4-benzodioxan is obtained as an oil. A solution of 1.75 parts of this compound in 8 parts of acetone is added to a solution of 0.59 part of oxalic acid in 8 parts of acetone. When the separation of solid is substantially complete the mixture is filtered and the residual solid is crystallised from a mixture of methanol and ethyl acetate. There is thus obtained 5-(2 - hydroxy-3-allylaminopropoxy)-1,4-benzodioxan hydrogen oxalate, M.P. 146–147° C.

Example 16

A solution of 1.5 parts of 7-(3-chloro-2-hydroxypropoxy)-2,3,4,5-tetrahydro-1,6-benzodioxocin and 0.8 part of t-butylamine in 8 parts of ethanol is heated in a sealed vessel at 100° C. for 10 hours. The vessel is cooled and then the excess of t-butylamine and the ethanol are evaporated. The residual gum is shaken together with a mixture of 20 parts of N-hydrochloric acid and 20 parts of ether, and the ethereal phase is then discarded. The aqueous acid solution is made alkaline by the addition of 4 parts of 8 N-aqueous sodium hydroxide, and the alkaline solution is extracted with ether. The ethereal extract is washed with water and dried with anhydrous magnesium sulphate, and is then evaporated to dryness. The residual oil is dissolved in 20 parts of ether, and ethereal hydrogen chloride is added until the separation of solid is substantially complete. The mixture is filtered and the residual solid is crystallised from ethyl acetate. There is thus obtained 7-(3-t-butylamino-2-hydroxypropoxy)-2,3,4,5-tetrahydro - 1,6 - benzodioxocin hydrochloride, M.P. 118–119° C.

The 7-(3-chloro-2-hydroxypropoxy)-2,3,4,5-tetrahydro-1,6-benzodioxocin used as starting material may be obtained as follows:

A mixture of 3 parts of 7-hydroxy-2,3,4,5-tetrahydro-1,6-benzodioxocin, 10 parts of epichlorhydrin and 0.1 part of piperidine is heated at 100° C. for 18 hours, and then the excess of epichlorhydrin is removed under reduced pressure. The residual oil is shaken with a mixture of 40 parts of chloroform and 13 parts of concentrated hydrochloric acid, and the aqueous phase is then discarded. The chloroform solution thus obtained is washed with water, dried with anhydrous magnesium sulphate, and then evaporated to dryness. There is thus obtained 7-(3-chloro - 2 - hydroxypropoxy)-2,3,4,5-tetrahydro-1,6-benzodioxocin as an oil.

7-hydroxy-2,3,4,5-tetrahydro - 1,6 - benzodioxocin itself may be obtained as follows:

284 parts of 1,4-dibromobutane are added to a stirred solution of 74 parts of pyrogallol and 65.4 parts of potassium hydroxide in 350 parts of dry ethanol at ambient temperature. When the initial exothermic reaction has subsided, the resulting mixture is stirred and heated under reflux in an atmosphere of nitrogen for 16 hours. The mixture is then cooled and filtered and the filtrate is evaporated to dryness. The residual oil is dissolved in 400 parts of ether, and the ethereal solution is washed four times with 250 parts of water each time. The ethereal solution is dried with anhydrous magnesium sulphate and then the ether is evaporated. The residual oil is distilled under reduced pressure and the fraction of B.P. 138–142° C. at 0.8 mm. pressure is collected. This fraction is stirred together with 300 parts of benzene, and the solid thus precipitated is removed by filtration and discarded. The filtrate is evaporated to remove the benzene, and the residue thus obtained is heated under reflux with 600 parts of light-petroleum (B.P. 60–80° C.). The hot light-petroleum extract is decanted from insoluble material and then allowed to cool. The solid which separates is isolated by filtration and there is thus obtained 7-hydroxy-2,3,4,5-tetrahydro-1,6-benzodioxocin, M.P. 64–65° C.

*Example 17*

A solution of 0.3 part of bromine in 30 parts of acetic acid is added during 15 minutes to a solution of 0.5 part of 5 - (2 - hydroxy - 3 - isopropylaminopropoxy) - 1,4-benzodioxan in 25 parts of acetic acid. When the addition is complete the solution is warmed to 40° C. for 5 minutes and is then kept at ambient temperature for 1 hour. The acetic acid is removed by distillation under reduced pressure and the residual gum is dissolved in 20 parts of water. This solution is made alkaline by the addition of 5 parts of 8 N-sodium hydroxide solution and is then twice extracted with ether, using 40 parts of ether each time. The combined extracts are washed with water, dried with anhydrous magnesium sulphate, and the ether is evaporated. The residual solid is crystallised from light-petroleum (B.P. 40–60° C.), and there is thus obtained 6- or 8 - bromo - 5 - (2 - hydroxy - 3 - isopropylaminopropoxy)-1,4-benzodioxan, M.P. 98–99° C.

*Example 18*

A mixture of 0.9 part of 4-(3-chloro-2-hydroxypropoxy)xanthene, 10 parts of ethanol and 14 parts of isopropylamine is heated at 100° C. during 10 hours in a sealed tube. The contents of the tube are washed out with ethanol, and the ethanol and excess isopropylamine are removed from the mixture by distillation under reduced pressure. The residue is dissolved in 50 parts of 2 N-hydrochloric acid solution, and the acidic solution is washed twice with 20 parts of ether, the ethereal solution being discarded. The acidic solution is basified by addition of 10 N-sodium hydroxide solution and the alkaline solution is extracted four times, each time with 50 parts of chloroform. The combined chloroform extracts are washed with 50 parts of water, dried over anhydrous magnesium sulphate, and the chloroform is removed by distillation under reduced pressure. The residue is crystallised from a mixture of cyclohexane and benzene, and there is thus obtained 4-(2-hydroxy-3-isopropylaminopropoxy)xanthene, M.P. 128–129° C.

The 4 - (3 - chloro - 2 - hydroxypropoxy)xanthene used as starting material may be obtained in the following manner:

The process for the preparation of 4-(3-chloro-2-hydroxypropoxy)xanthone described in Example 5 is repeated except that 0.99 part of 4-hydroxyxanthene is used in place of 2 parts of 4-hydroxyxanthone. There is thus obtained 4-(3-chloro-2-hydroxypropoxy)xanthene as an oil.

4-hydroxyxanthene itself may be prepared as follows:

To a suspension of 2.26 parts of 4-methoxyxanthone in 60 parts of warm n-butanol are added 5 parts of sodium metal in small portions during 1 hour. The mixture is refluxed during one hour, cooled and poured into 500 parts of ice-cold water. The mixture is extracted 4 times each time with 50 parts of ether. The combined ethereal extracts are washed twice with 20 parts of saturated sodium chloride solution, and then dried over anhydrous magnesium sulphate. The ether and excess n-butanol are removed by distillation, and the residue is crystallized from ethanol. There is thus obtained 4-methoxyxanthene, M.P. 60–61° C. 1 part of this compound is suspended in 25 parts of dry xylene, and 1.5 parts of anhydrous aluminum chloride are added. The mixture is heated at 100° C., and then cooled and decomposed by addition of 100 parts of ice-cold 2 N-hydrochloric acid. Steam is passed through the mixture until no more xylene distils over, the residue is cooled, and the solid which separates is filtered off and crystallised from aqueous ethanol. There is thus obtained 4-hydroxyxanthene, M.P. 121–122° C.

*Example 19*

0.82 part of 8-hydroxychroman-4-one are disclosed in a solution of 0.24 part of sodium hydroxide in 20 parts of water. The solution is stirred and kept at a temperature not exceeding 20° C. while 0.65 part of epichlorohydrin is added. The mixture is stirred during 18 hours, and is then extracted three times with 30 parts of chloroform. The combined chloroform extracts are washed with water, dried over anhydrous magnesium sulphate, and the chloroform is removed by distillation under reduced pressure. There is thus obtained 8-(1,2-epoxy-3-propoxy)-chroman-4-one as an oil. This product is dissolved in 10 parts of isopropylamine and the solution is kept at room temperature during 18 hours. Excess isopropylamine is removed by distillation, and the residue is dissolved in 50 parts of 2 N-hydrochloric acid. The acidic solution is extracted twice with 20 parts of ether, and the extracts are discarded. The acidic solution is basified by addition of 5 N-sodium hydroxide solution, and the alkaline solution is extracted three times, each time with 50 parts of ether. The combined etheral extracts are washed with water, dried over anhydrous magnesium sulphate, and the ether is removed by distillation. The residue is crystallised from a mixture of benzene and petroleum ether (B.P. 60–80° C.), and there is thus obtained 8-(2-hydroxy - 3 - isopropylaminopropoxy)chroman-4-one, M.P. 90–91° C.

The 8-hydroxychroman-4-one used as starting material may be obtained as follows:

1 part of 8-methoxychroman-4-one is dissolved in 10 parts of dry xylene, and 1.5 parts of anhydrous aluminium chloride are added. The solution is heated at 100° C. during 1 hour. The mixture is cooled and poured into 50 parts of ice-cold 2 N-hydrochloric acid. The precipitated solid is filtered off, dried, and crystallised from benzene.

There is thus obtained 8-hydroxychroman-4-one, M.P. 166–167° C.

Example 20

1.98 parts of 4-hydroxyxanthene are dissolved in a solution of sodium ethoxide prepared from 0.23 part of sodium and 20 parts of ethanol. 2.05 parts of 1,2-epoxy-3-(N-benzyl-N-isopropylamino)propane are added, and the mixture is heated in a sealed vessel at 120° C. during 10 hours. The contents of the sealed vessel are washed out with 20 parts of ethanol, and the ethanol is removed by distillation under reduced pressure. The residue is dissolved in 50 parts of 2 N-hydrochloric acid solution, the acid solution is extracted twice with 50 parts of ether, and the ethereal extracts are discarded. The aqueous solution is basified by addition of 5 N-sodium hydroxide solution, and the resulting alkaline solution is extracted three times with 50 parts of ether. The combined ethereal extracts are washed with 50 parts of water, dried over anhydrous magnesium sulphate, and the ether is removed by distillation. There is thus obtained 4-[3-(N-benzyl-N - isopropylamino) - 2 - hydroxypropoxy]xanthene as an oil. This product is dissolved in 64 parts of ethanol, and 0.8 part of a 5% pallaium-on-charcoal catalyst is added. The mixture is shaken in an atmosphere of hydrogen at ambient temperature and at a pressure of one atmosphere until no further uptake of hydrogen is observed. The mixture is filtered and the ethanol is removed from the filtrate by distillation under reduced pressure. The residue is stirred together with ethyl acetate, and the solid product that separates is filtered off and crystallised from a mixture of cyclohexane and benzene. There is thus obtained 4 - (2 - hydroxy - 3 - isopropylaminopropoxy) xanthene, M.P. 128–129° C.

Example 21

A mixture of 3.4 parts of 2,3-dihydro-6-hydroxybenzofuran, 30 parts of epichlorohydrin and 0.2 part of piperidine is heated at 100° C. during 5½ hours. The mixture is cooled, and the excess of epichlorohydrin is removed by distillation under reduced pressure. There is thus obtained 6-(3-chloro-2-hydroxypropoxy)-2,3-dihydrobenzofuran as an oil. This product is dissolved in 17.5 parts of isopropylamine, and the solution is heated in a sealed vessel at 100° C. during 10 hours. The mixture is cooled, and the excess of isopropylamine is removed by distillation under reduced pressure. The residue is dissolved in 50 parts of 2 N-hydrochloric acid solution, the acidic solution is washed twice with 50 parts of ether, and the ethereal washings are discarded. The acidic solution is basified by addition of 2 N-sodium hydroxide solution. The alkaline solution is extracted twice with 100 parts of ether, and the combined ethereal extracts are washed with 50 parts of water, dried over anhydrous magnesium, sulphate and the ether is removed by distillation. The residue is crystallised from cyclohexane, and there is thus obtained 2,3-dihydro-6-(2 - hydroxy - 3 - isopropylaminopropoxy) benzofuran, M.P. 96–99° C.

Example 22

A solution of 3 parts of 5-(3-chloro-2-hydroxypropoxy)-1,4-benzodioxan and 1.8 parts of t-butylamine in 12 parts of ethanol is heated in a sealed vessel at 100° C. for 10 hours. The vessel is cooled, and the ethanol and the excess of t-butylamine are evaporated under reduced pressure. The residual gum is shaken together with 50 parts of N-hydrochloric acid and 50 parts of ether. The aqueous phase is separated, 10 parts of 8 N-sodium hydroxide solution are added to it, and the mixture is extracted with ether. The ethereal extract is washed with water, dried with anhydrous magnesium sulphate, and then evaporated to dryness. The solid residue is crystallised from a mixture of ethyl acetate and light-petroleum (B.P. 40–60° C.), and there is thus obtained 5-(3-t-butylamino-2-hydroxypropoxy)-1,4-benzodioxan, M.P. 71–72° C.

Example 23

A solution of 5 parts of 5-(3-chloro-2-hydroxypropoxy)-1,4-benzodioxan and 5.8 parts of 1-methyloctylamine in 10 parts of ethanol is heated in a sealed vessel at 100° C. for 10 hours. The vessel is cooled and the ethanol is evaporated under reduced pressure. The residual gum is shaken together with 100 parts of N-hydrochloric acid and 200 parts of chloroform. The aqueous acid layer is discarded. The chloroform extract is washed six times with 25 parts of N-hydrochloric acid each time, and is then washed twice with 25 parts of water each time. The chloroform solution is dried over anhydrous magnesium sulphate and then the chloroform is evaporated. The residual gum is dissolved in 40 parts of ethyl acetate. This solution is cooled to 0° C., and 40 parts of ether are added gradually. Solid slowly separates from the solution. When the separation of solid is substantially complete the mixture is filtered. The residual solid is crystallised from a mixture of methanol and ethyl acetate, and there is thus obtained 5-[2-hydroxy-3-(1-methyloctylamino)propoxy]-1,4-benzodioxan hydrochloride, M.P. 121–122° C.

Example 24

A solution of 0.27 part of 5-(2-hydroxy-3-t-butyl-aminopropoxy)-1,4-benzodioxan and 2 parts of 40% formalin in 20 parts of benzene is heated under reflux in a Dean and Starke apparatus for 24 hours, and then the solvent is removed by evaporation under reduced pressure. The residual oil is dissolved in 10 parts of petroleum ether (B.P. 40–60° C.). The solution is evaporated to half-volume and cooled. It is then filtered, and the solid residue is washed with petroleum ether (B.P. 40–60° C.), dried, and crystallised from petroleum ether (B.P. 40–60° C.). There is thus obtained 5-(1,4-benzodioxan-5-yloxymethyl) - 3 - t-butyl-oxazolidine, M.P. 65–66° C.

Example 25

A mixture of 10 parts of 5-(2-hydroxy-3-isopropylaminopropoxy)-1,4-benzodioxan and 80 parts of mannitol is passed through a 60-mesh screen. Sufficient of a 10% aqueous solution of gelatin is then added to make a stiff paste. The paste is passed through a 16-mesh screen, dried and then passed through a 20-mesh screen. To the resulting granules are added 6 parts of alginic acid and 2 parts of magnesium stearate. The resulting mixture is compressed into tablets by known means, and there are thus obtained tablets suitable for therapeutic use.

The 10 parts of 5-(2-hydroxy-3-isopropylaminopropoxy)-1,4-benzodioxan are replaced by 10 parts of 5-[2-hydroxy-3-(2-hydroxy-1,1-dimethylethylamino) propoxy]-1,4-benzodioxan,
5-(3-t-butylamino-2-hydroxypropoxy)-1,4-benzodioxan,
4-(2-hydroxy-3-isopropylaminopropoxy)xanthone,
4-(2-hydroxy-3-isopropylaminopropoxy)xanthene,
4-(3-t-butylamino-2-hydroxypropoxy)xanthone,
4-[2-hydroxy-3-(2-hydroxy-1,1-dimethylethylamino) propoxy]xanthone, or
4-[2-hydroxy-3-(2-hydroxy-1,1-dimethylethylamino) propoxy]xanthene, and there are thus obtained in a similar manner tablets suitable for therapeutic use.

Example 26

A mixture of 50 parts of 5-(2-hydroxy-3-isopropylaminopropoxy)-1,4-benzodioxan, 125 parts of maize starch, 270 parts of calcium phosphate and 1 part of magnesium stearate is compressed and the compressed mixture is then broken down into granules by passages through a 16-mesh screen. The resultant granules are then compressed into tablets according to the known art. There are thus obtained tablets suitable for therapeutic purposes.

The 50 parts of 5-(2-hydroxy-3-isopropylaminopropoxy)-1,4-benzodioxan are replaced by 50 parts of 5-[2-hydroxy-3-(2-hydroxy-1,1-dimethylethylamino)
 propoxy]-1,4-benzodioxan,
5-(3-t-butylamino-2-hydroxypropoxy)-1,4-benzodioxan,
4-(2-hydroxy-3-isopropylaminopropoxy)xanthone,
4-(2-hydroxy-3-isopropylaminopropoxy)xanthone,
4-(3-t-butylamino-2-hydroxypropoxy)xanthone,
4-[2-hydroxy-3-(2-hydroxy-1,1-dimethylethylamino)
 propoxy]xanthone, or
4-[2-hydroxy-3-(2-hydroxy-1,1-dimethylethylamino)
 propoxy]xanthene, and there are thus obtained in a similar manner tablets suitable for therapeutic use.

What we claim is:

1. A compound selected from the group consisting of compounds of the formula:

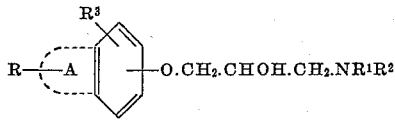

wherein $R^1$ is selected from hydrogen and alkyl of 1–6 carbon atoms, $R^2$ contains up to 10 carbon atoms and is selected from alkyl, hydroxyalkyl, alkoxyalkyl, cycloalkyl, alkenyl, aralkyl, alkylaralkyl and alkoxyaralkyl, $R^3$ is selected from hydrogen and halogen, A is selected from 5-, 6-, 7- and 8- membered heterocyclic rings containing 1–2 oxygen atoms and R is selected from hydrogen alkyl of 1–6 carbon atoms, oxo, hydroxy and the group of the formula —CH=CH—CH=CH— which together with the ring A forms a fused benzene ring, and the pharmaceutically-acceptable acid-addition salts thereof, and the oxazolidine derivatives thereof having the formula:

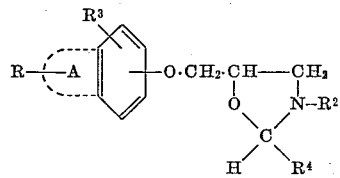

where R, $R^1$, $R^2$, $R^3$, and A are as defined above and $R^4$ is selected from alkyl of 1–6 carbon atoms, hydrogen and phenyl, and the pharmaceutically-acceptable acid addition salts thereof.

2. A compound as claimed in claim 1 wherein $R^2$ stands for 2-hydroxy-1,1-dimethylethyl or 1-methyl-3-phenylpropyl.

3. A compound as claimed in claim 1 wherein A represents the atoms necessary to complete with the adjacent ring a member of the group consisting of 1,4-benzodioxan, 1,3-benzodioxole, 3,4-dihydro-2H-1,5-benzodioxepin, 2,3,4,5-tetrahydro-1,6 - benzodioxocin, xanthone, xanthene, 9-hydroxyxanthene, 2,3-dihydrobenzofuran and chroman-4-one.

4. A compound selected from the group consisting of 5-(2-hydroxy-3-isopropylaminopropoxy) - 1,4 - benzodioxan and the acid addition salts thereof.

5. A compound selected from the group consisting of 4-(2-hydroxy-3-isopropylaminopropoxy)xanthone, and the acid addition salts thereof.

6. A compound selected from the group consisting of 4-(2-hydroxy-3-t-butylaminopropoxy)xanthone, and the acid addition salts thereof.

7. A compound selected from the group consisting of 4-(2-hydroxy-3-isopropylaminopropoxy)xanthene, and the acid addition salts thereof.

8. A compound selected from the group consisting of 6-(3-t-butylamino-2-hydroxypropoxy)-3,4-dihydro-2H-1,5-benzodioxepin, and the acid addition salts thereof.

9. A compound selected from the group consisting of 6 - (2-hydroxy-3-isopropylaminopropoxy)-3,4 - dihydro-2H-1,5-benzodioxepin, and the acid addition salts thereof.

10. A compound selected from the group consisting of 9-hydroxy-4-(2-hydroxy - 3 - isopropylaminopropoxy)xanthene, and the acid addition salts thereof.

11. A compound selected from the group consisting of 4-[2-hydroxy-3-(2-hydroxyl-1,1 - dimethylethylamino) propoxy]xanthene, and the acid addition salts thereof.

12. A compound selected from the group consisting of 4-[2-hydroxy-3-(2-hydroxy-1,1 - dimethylethylamino) propoxy]xanthone, and the acid addition salts thereof.

13. A compound selected from the group consisting of 8-(2-hydroxy - 3-isopropylaminopropoxy)chroman - 4- one, and the acid addition salts thereof.

14. A compound selected from the group consisting of compounds of the formula:

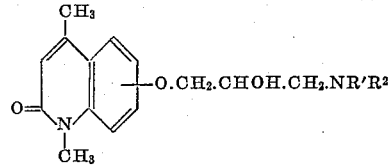

wherein R' is selected from hydrogen and alkyl of 1–6 carbon atoms and $R^2$ contains up to 10 carbon atoms and is selected from alkyl, hydroxyalkyl, alkoxyalkyl, cycloalkyl, alkenyl, aralkyl, alkylaralkyl and alkoxyaralkyl, and the pharmaceutically acceptable acid addition salts thereof, and the compounds of the formula:

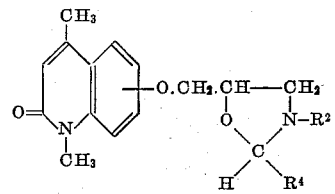

where $R^2$ is as defined above and $R^4$ is selected from alkyl of 1–6 carbon atoms, hydrogen and phenyl, and the pharmaceutically-acceptable acid addition salts thereof.

References Cited

UNITED STATES PATENTS

| | | | |
|---|---|---|---|
| 2,807,567 | 9/1957 | Rothlin et al. | 167—65 |
| 2,872,374 | 2/1959 | Beiler et al. | 167—65 |
| 2,984,668 | 5/1961 | Kalm et al. | 260—307 |
| 3,198,806 | 8/1965 | Ham | 260—307 |

OTHER REFERENCES

Burger: Medicinal Chemistry, Interscience, 1960, p. 79, 1960.

Ring et al.: J. Pharm. Pharmacol, vol. 4 (1952), pp. 21 to 26.

ALEX MAZEL, *Primary Examiner.*

HENRY R. JILES, *Examiner.*

R. J. GALLAGHER, *Assistant Examiner.*